United States Patent [19]
Russell

[11] 3,719,392
[45] March 6, 1973

[54] DUMP BODY VEHICLE

[76] Inventor: Arvin E. Russell, 430 Sandra Lane, Indianapolis, Ind. 46227

[22] Filed: Oct. 13, 1971

[21] Appl. No.: 188,800

[52] U.S. Cl. ..................298/5, 214/506, 214/512, 298/14, 298/19 V
[51] Int. Cl. ..........................B60p 1/02, B60p 1/34
[58] Field of Search ....298/5, 6, 12, 13, 14; 214/506, 214/512, 513

[56] References Cited

FOREIGN PATENTS OR APPLICATIONS

| 446,084 | 10/1967 | Switzerland | 298/5 |
| 449,436 | 12/1967 | Switzerland | 298/5 |

*Primary Examiner*—Richard J. Johnson
*Assistant Examiner*—Reinhard Eisenzopf
*Attorney*—Hood, Gust, Irish, Lundy & Coffey

[57] ABSTRACT

A dump body vehicle including a frame and a body, the rear end of the body being pivotally supported from upstanding resilient suspension assemblies supported, in turn, from crank axles journaled at the rear end of the frame to rock rearwardly at times, the front end of the body being longitudinally slidable relative to the frame and guidedly supported from the frame which is formed to provide a rearwardly and downwardly inclined section which lowers the front end of the body commensurately as the rear end of the body descends during such rocking of the suspension assemblies, whereby the body assumes a substantially horizontal depressed position for easy loading, together with a latching device to hold the suspension assemblies against such rocking for transit. Another latching device can be withdrawn to permit the front end of the body to rise relative to the frame to a dumping position, and a winch and cable are provided to move the body forwardly to transit position and, when the body is in its transit position, to elevate its front end. An open-ended pulley is provided so that the cable may be readily engaged therewith to facilitate the advantageous application of force to move the body forwardly, or disengaged therefrom to facilitate the advantageous application of force to lift the front end of the body.

11 Claims, 9 Drawing Figures

INVENTOR
ARVIN E. RUSSELL
BY
Hood, Gust, Irish, Lundy & Coffey
ATTORNEYS

PATENTED MAR 6 1973 3,719,392
SHEET 2 OF 3
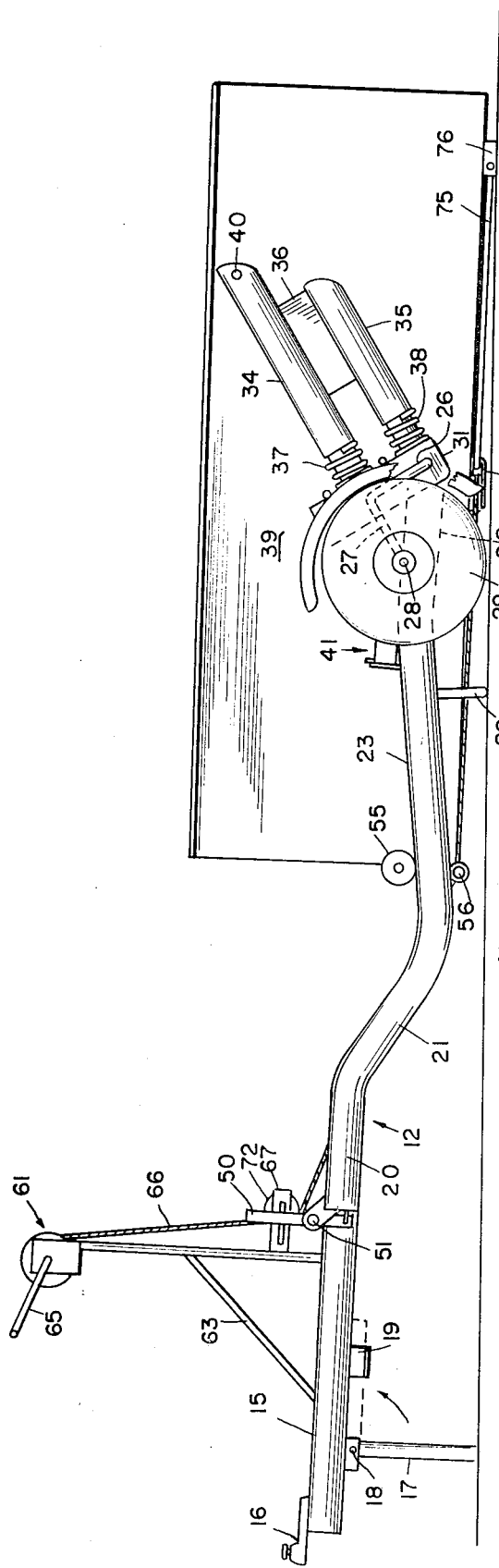
Fig. 4
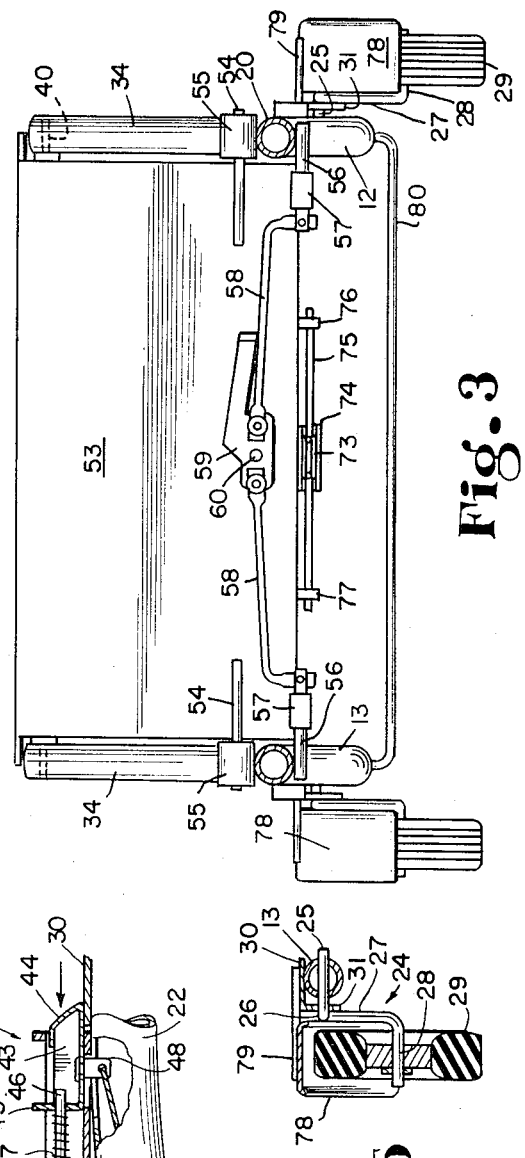
Fig. 3
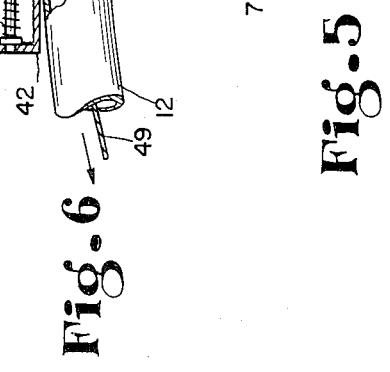
Fig. 6
Fig. 5
INVENTOR
ARVIN E. RUSSELL
BY
Hood, Gust, Irish, Lundy & Coffey
ATTORNEYS INVENTOR
ARVIN E. RUSSELL
BY
Hood, Gust, Irish, Lundy & Coffey
ATTORNEYS

DUMP BODY VEHICLE

The present invention relates to a dump body vehicle and a preferred embodiment of the invention is illustrated and will be described as a two-wheeled trailer vehicle. The primary object of the invention is to provide a vehicle consisting of a frame and a body so mounted upon the frame that, when the body is moved rearwardly relative to the frame, the body will be caused to descend, substantially in a horizontal attitude, substantially to the level upon which the wheels are supported; and in which, when the body is returned to its forward position relative to the frame, the body will be elevated to a transit position and securely latched therein; and in which, after retraction of a separate latching means, the front end of the body can be elevated to tilt the body to a dumping position.

Further objects of the invention will appear as the description proceeds.

To the accomplishment of the above and related objects, the present invention may be embodied in the form illustrated in the accompanying drawing, attention being called to the fact, however, that the drawing is illustrative only, and that change may be made in the specific construction illustrated and described so long as the scope of the appended claims is not violated.

In the drawing:

FIG. 3 is a front section taken substantially on the line 3—3 of FIG. 1;

FIG. 4 is a view similar to FIG. 1 with the parts shown in loading position;

FIG. 5 is a fragmentary sectional view taken substantially on the line 5—5 of FIG. 1;

FIG. 6 is a fragmentary sectional view of a latch device;

Figure 1:
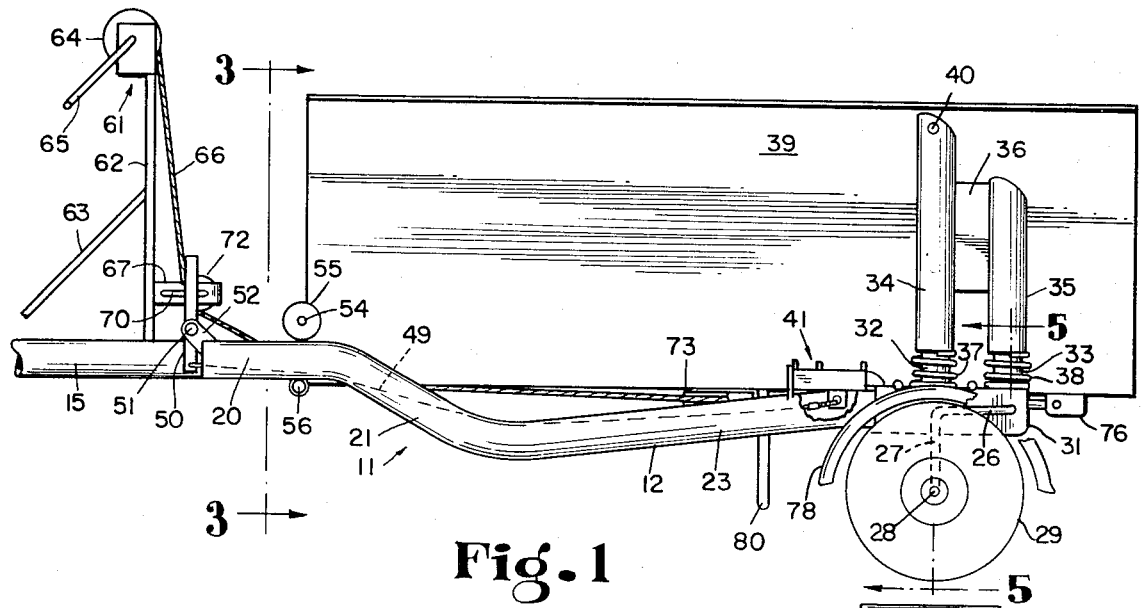
FIG. 1 is a side elevation of a preferred embodiment of my invention with the parts in transit position, parts being broken away for clarity of illustration.
Figure 2:
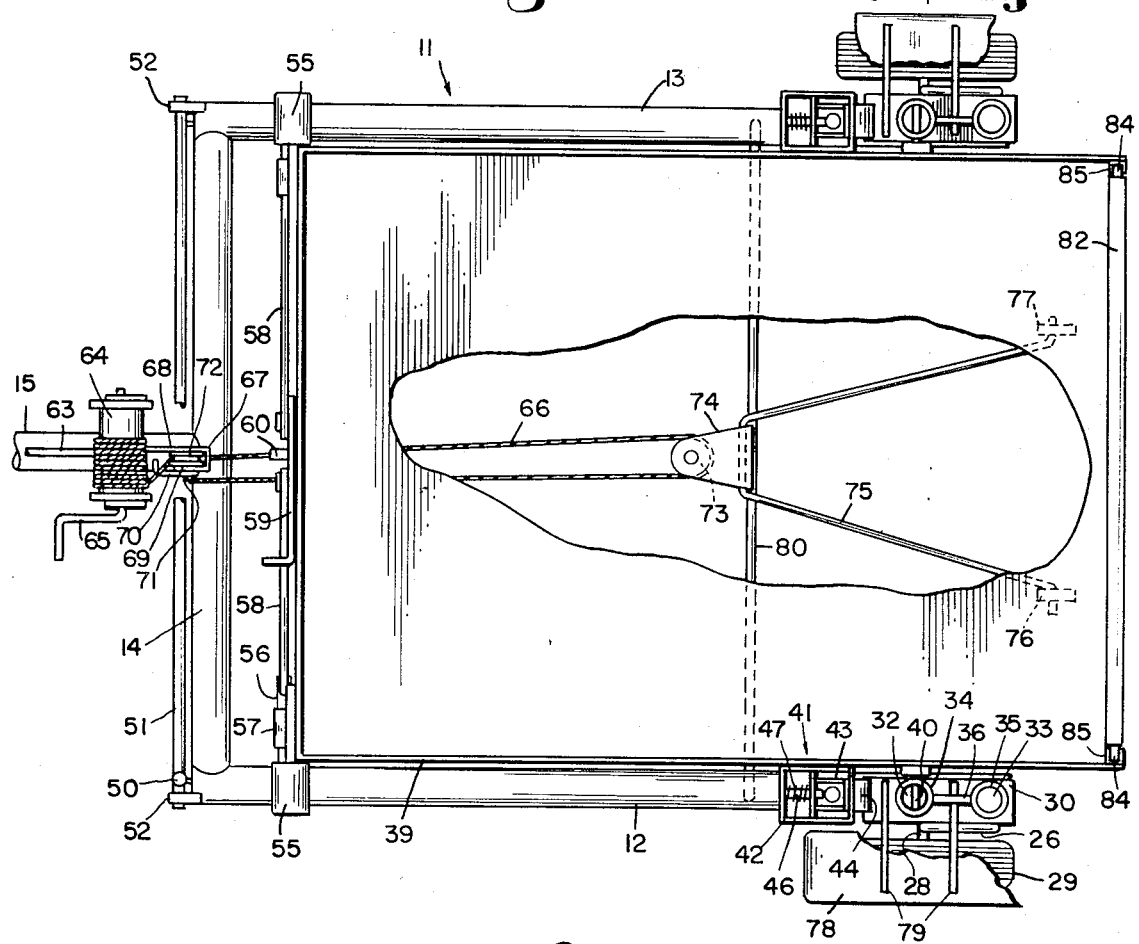
FIG. 2 is a top plan view of the embodiment illustrated in FIG. 1.

Referring more particularly to the drawings, it will be seen that, in FIGS. 1 and 2, I have illustrated a frame indicated generally by the reference numeral 11 and comprising parallel beams 12 and 13 joined, at their forward ends, by a stretcher 14 from which extends forwardly a central tongue 15 provided with a hitch part 16 and a foot 17 pivoted at 18 to be swung between its active position illustrated in solid lines in FIG. 4 and its inactive position illustrated in broken lines wherein it is sustained by a clip 19 or other retainer means. Obviously, when the illustrated vehicle is connected to a towing vehicle, the foot 17 will be retained in its broken line position.

The two beams 12 and 13 are identical and therefore only one will be described. The beam 12 comprises a forward section 20, a rearwardly and downwardly inclined section 21, a rear section 22 and an intermediate section 23 merging with the sections 21 and 22. Although the word "section" has been used, it will be understood that each beam may be an integral tube bent to the illustrated contour.

For each beam, there is provided a crank axle 24, each consisting of an inturned end portion 25 arranged transversely to its beam and journalled relative thereto, a forwardly extending portion 26, a downwardly extending portion 27 and an outturned end portion 28 upon which is journalled a wheel 29.

For each axle, there is provided a platform 30 having a downturned flange 31 welded or otherwise fixed to move with the axle portion 26, the platform being so proportioned and arranged that, when the axle is in the position of FIG. 1, the platform 30 will be substantially parallel to, and will substantially rest upon, the rear section 22 of its associated beam. As is most clearly to be seen in FIG. 5, the flange 31 is preferably penetrated by the axle portion 25.

Each platform 30 supports a pair of longitudinally spaced posts 32 and 33 upon which are respectively slidably mounted a pair of sleeves 34 and 35 joined against relative movement by a plate 36. Springs 37 and 38 are interposed between the platform 30 and the lower ends of the sleeves 34 and 35 whereby said sleeves are resiliently suspended from the platform 30.

The above-described structure comprises suspension means on each side of the vehicle for a body 39 disposed between the beams 12 and 13 and pivotally connected to the suspension means by pivots 40 at the upper ends of the respective sleeves 34, 34.

Each beam supports latch means indicated generally by the reference numeral 41. As is most clearly illustrated in FIG. 6, each such latch means comprises a case 42 fixed to its associated beam and providing guide means for latch bolt 43 reciprocable in the direction of length of its associated beam, each such bolt having a downwardly and rearwardly bevelled rear end 44. At its front end, the latch bolt is formed with an upwardly extending tail 45 penetrated by a guide pin 46 fixed to the rear end of the case 47 and having sleeved thereon a coiled spring confined between the rear end of the case and the latch tail 45, whereby the bolt is resiliently biased rearwardly. A tang 48 fixed to the floor of the bolt 43 penetrates a slot in the associated beam 12, and a flexible strand 49 is secured at one end to said tang within the beam, extends forwardly through the beam and is connected at its other end to a lever 50 secured to a rock shaft 51 oscillably mounted in ears 52, 52 fixed to the forward ends of the beams 12 and 13. Obviously, if the lever 50 is rocked in a clockwise direction as viewed in FIG. 1, the latch bolt 43 will be retracted against the tendency of the spring 47.

Figure 8:
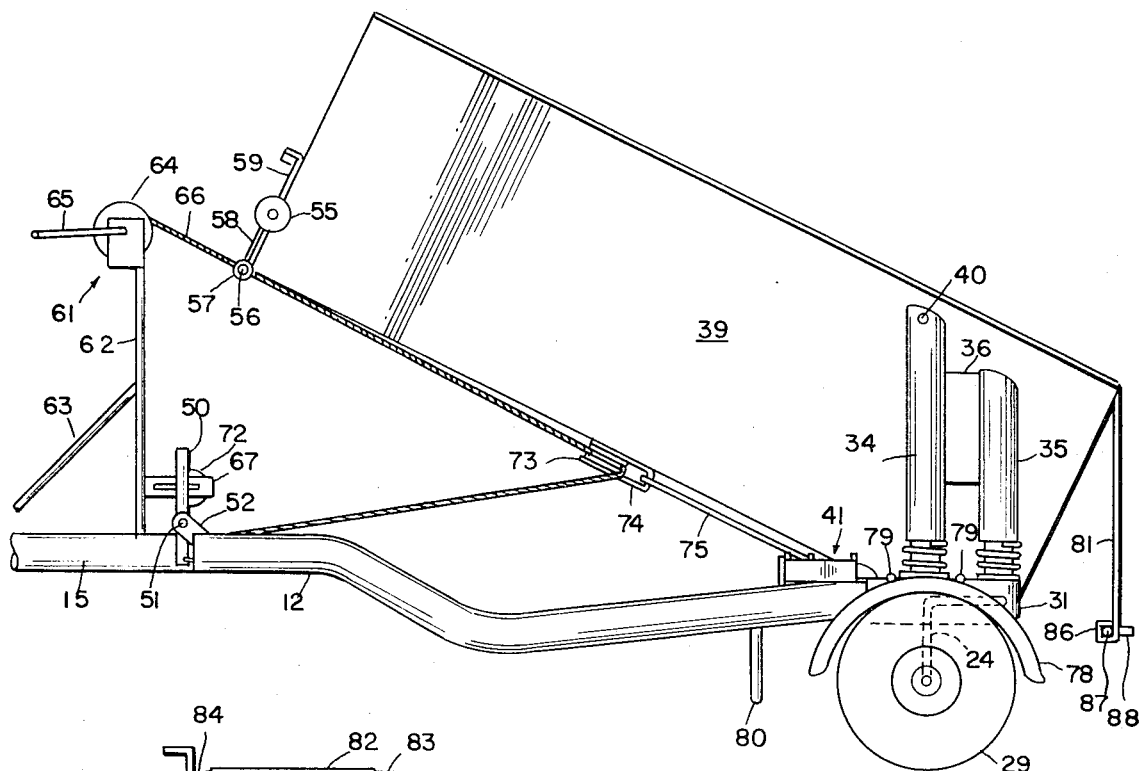
FIG. 8 is a side elevation showing the parts in dumping position.
Figure 9:
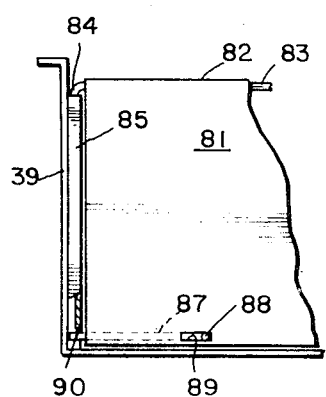
FIG. 9 is a fragmentary rear elevation showing details of the tailgate and the suspending and latching devices therefor.

With the parts in the positions of FIGS. 1, 6 and 8, the latch bolts 44 overlie the forward ends of the platforms 30 to retain the axles 24 from rocking movement about the axes of their end portions 28.

Fixed relative to the forward wall 53 of the body 39 are stub axles 54, 54 upon the outer end portions of which are journalled rollers 55 positioned to bear upon the sections 20 of the beams 12 and 13 to support the forward end of the body 39. Latch pins 56, 56 are reciprocably supported and guided in bearings 57, 57 fixed to the body wall 53 adjacent the opposite edges thereof, said latch pins, when in the positions of FIG. 3, underlying the beams 12 and 13, respectively, to retain the forward end of the body against upward movement relative to the beams. It will be apparent that, with the latch pins 56, 56 in their projected positions, the forward end of the body 39 will be forced to follow the declination of the beam sections 21 whenever the body 39 moves rearwardly relative to the frame 11.

Figure 7:
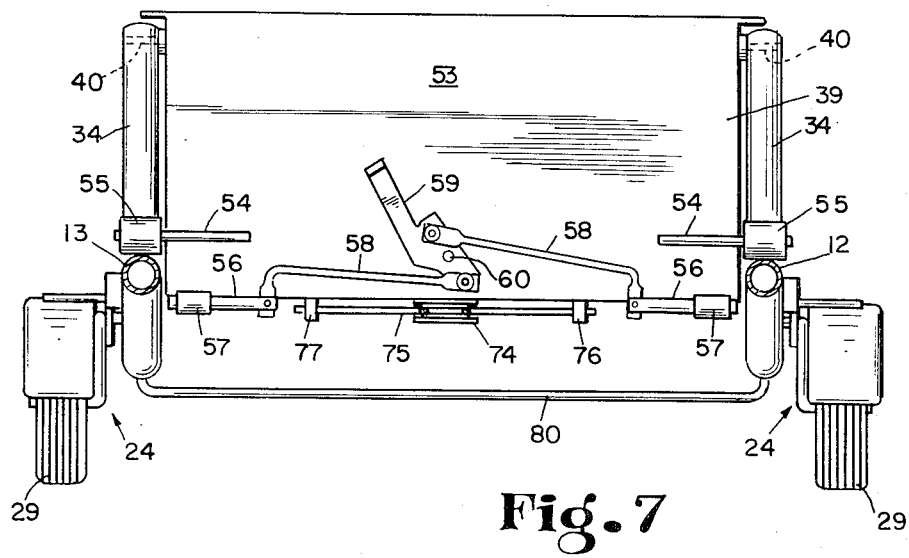
FIG. 7 is a view similar to FIG. 3 but showing the second latch mechanism retracted.

Links 58, 58 are pivotally connected, respectively, to the latch pins 56, 56 and to an actuator 59 at points spaced oppositely from a pivot 60 fixed to the front wall of the body and oscillably supporting the actuator 59. When the actuator 59 is in the position of FIG. 3, the pins 56, 56 will be projected; and when the actuator 59 is in the position of FIG. 7, the pins 56, 56 will be retracted from cooperative engagement with the beams 12 and 13.

A winch, indicated generally by the reference numeral 61, is supported in an elevated position from a mast 62 upstanding from the tongue 15 and stabilized by a brace 63. The winch 61 comprises a drum 64 with a crank handle 65, and a flexible strand 66 is wound upon the drum 24. Near the base of the mast 62 is supported a rearwardly extending bracket 67. As is most clearly to be seen in FIG. 2, the bracket 67 comprises a U-shaped member having a major, rearwardly-extending arm 68 and a minor, forwardly-extending arm 69 terminating short of the mast 62, preferably with a guard finger 70 extending forwardly beyond the end of the minor arm 69 and there having an end portion turned toward the major arm 68. An axle 71 for a pulley 72 spans the arms 68, 69 but, as will be clear, is left with an open end so that the strand 66 may readily be moved either into engagement with the pulley 72 as shown in FIGS. 1, 2 and 4, or out of engagement with said pulley as shown in FIG. 8.

The strand 66 leads from the drum 64, either around the pulley 72 or directly, to a sheave 73 carried by a fitting 74 and thence back to an anchorage of any kind upon the stretcher 14. The fitting 74, in turn, is carried by a bridle 75 engaged, at its rear ends, with anchorages 76 and 77 depending from the floor of the body 39 near its rear end.

Fenders 78 may guard the wheels 29, being supported, respectively, by support bars 79 fixed to move with the respective platforms 30.

A transverse rest bracket 80 preferably spans the beams 12 and 13, depending therefrom in the manner clearly illustrated in, for instance, FIGS. 1, 2 and 3.

At its rear end, the body is provided with a tailgate 81 having a rolled or otherwise suitably formed upper edge 82 receiving a hanger bar 83 whose opposite ends are turned down as at 84 to be received in the open upper ends of fixed tubes 85 disposed at the opposite sides of the rear end of the body 39. Thus, the tailgate is mounted to swing about the axis of its upper edge. At its lower edge, the tailgate is rolled or otherwise formed as at 86 to receive laterally slidable latch bars 87 having finger pieces 88 projecting rearwardly through slots 89 so that the outer ends of said bars may be projected into, or retracted from, openings 90 in the tubes 85 for latching or releasing the lower edge of tailgate 81.

Operation

When parked, the vehicle of the present disclosure will ordinarily be in the condition illustrated in FIG. 1, with the foot 17 in the active position of FIG. 4. If desired, the winch 61 may be provided with a ratchet or other braking device (not shown) but it is not necessary at this time, since the latches 41 will hold the body 39 in its transit position whether the strand 66 is taut or relaxed.

If it is desired to load the body, the lever 50 will be moved in a clockwise direction as viewed in FIG. 2 to withdraw the latch bolts 43 from the platforms 30. Since the weight of the rear end of the body is carried upon the portions 25 of the crank axles 24, the axles are out of equilibrium and, when the latch bolts are withdrawn, they will tend to turn in a clockwise direction as viewed in FIG. 1 toward the positions illustrated in FIG. 4. As the axles turn, the suspension means will swing in a clockwise direction to move the body 39 rearwardly with the rollers 55 bearing upon the uppermost surfaces of the beams 12 and 13. As the latch pins 56, 56 encounter the downwardly inclined lower surfaces of said beams, the forward end of the body 39 will be forced to follow the contour of the sections 21 of the beams, thus lowering the forward end of the body as the rearward end of the body is carried downwardly upon the pivots 40. It will be clear that the beams are so contoured that the body will move downwardly while maintaining a substantially horizontal attitude until the anchorages 76, 77 and the rest bracket 80 encounter the surface upon which the wheels 29 are resting. In fact, there may be times when the wheels 29 will actually be lifted off the ground, as suggested in FIG. 4. Obviously, the rate of descent of the body 39 may, if necessary or desirable, be controlled by braking the drum 64.

While a manual winch has been illustrated and described, it will be obvious that a power winch may be used if it is deemed necessary or desirable.

After the body has been loaded while in the convenient position of FIG. 4, the tailgate 81 may be closed and latched, whereafter the winch 61 will be operated to draw the body forwardly relative to the frame 11. As it moves forwardly, it will cause the suspension means to turn in a counterclockwise direction about the axis of the axle end portions 28, while the rollers 55 ride upwardly along the sections 21, whereby the body will rise in a substantially horizontal attitude. As the platforms 30 approach the horizontal, their forward edges will encounter the bevelled surfaces 44 of the latch bolts 43 to force those bolts forwardly against the tendency of their springs 47 until, as the body achieves the position of FIG. 1, the platform ends will pass the tips of the latch bolts 43 and those bolts will be forced rearwardly by their springs 47 to overlie the platform ends whereby the body is latched in transit position.

Now, the vehicle may be moved to the point at which its load is to be used, whereupon the strand 66 will be disengaged from the pulley 72 by moving its reach directly adjacent the drum 64 outwardly past the guard finger 70. Now the actuator 59 will be shifted from its position of FIG. 3 to its position of FIG. 7, thereby retracting the latch pins 56, 56 to disengage them from the beams 12 and 13. Now, the latch pins 87 may be retracted from their engagement with the tubes 85 and the winch 61 may be operated to lift the front end of the body 39 into the position of FIG. 8, the tailgate 81 swinging freely, as suggested in FIG. 8, to permit the load to slide through the now open rear end of the body.

After the load has been discharged, the winch 61 will be operated to pay out the strand 66 whereby the front end of the body will descend until, again, the rollers 55 rest upon the sections 20 of the beams 12 and 13, after which the actuator 59 will be returned to the position of FIG. 3 to retain the front end of the body against elevation relative to the frame.

What is claimed is:

1. A dump body vehicle comprising a frame, crank axle means journalled at the rear of said frame to support the same, wheels journalled on said crank axle means, suspension means supported from and moving with said means, a body having its rear end supported from said suspension means for rocking movement about an elevated axis parallel with the journal axis of said axle means, means for supporting the forward end of said body from said frame for forward and rearward movement relative to said frame, retractable latch means for restraining said axle means, at times, against rocking movement about the journal of said axle means, a second retractable latch means for restraining the front end of said body, at times, against elevation relative to said frame, and means carried by said frame for applying force to said body tending to move said body forwardly, and to elevate its front end, relative to said frame.

2. The vehicle of claim 1 including manipulable means mounted on said frame adjacent the front end thereof and operatively connected to retract said first-named latch means.

3. The vehicle of claim 1 including manipulable means mounted on said body near the front end thereof and operatively connected to retract said second latch means.

4. A dump body vehicle comprising a pair of joined, parallel, longitudinally-extending beams, a crank axle for each of said beams, each axle having an end portion journalled transversely near the rear end of its associated beam, a second transverse end portion upon which a wheel is journalled, and an intermediate body portion, a platform fixed relative to the body portion of each axle and extending forwardly therefrom to overlie the associated beam, suspension means upstanding from each platform, a body having its rear region disposed between the pivotally supported from said suspension means, latch means carried by each beam and engageable with the associated platform, at times, to retain said platforms, and therefore said axles, against turning movement about the common axis of said journalled axle end portions, and means at the forward end region of said body and cooperating with said beams to enforce controlled downward movement of said front body region as said body moves rearwardly relative to said frame to tilt said axles.

5. The vehicle of claim 4 including winch means supported in an elevated position from said frame at a point spaced forwardly from the forwardmost position of said body, and flexible strand means wound on said winch means, extending beneath the front end of said body and attached to said body near the rear end thereof.

6. The vehicle of claim 5 in which said means at the forward region of said body includes retractable means engageable, at times, with said frame to prevent elevation of said forward region relative to said frame.

7. The vehicle of claim 5 including guide means located between said winch and said body and at a level below said winch and close to said frame, one end of said guide means being open whereby said flexible strand means may be readily engaged with and disengaged from said guide means over said open end.

8. The vehicle of claim 4 including means carried by said frame for applying force to said body tending to move said body forwardly, and to elevate its front end, relative to said frame.

9. The vehicle of claim 4 including manipulable means mounted on said frame adjacent the front end thereof and operatively connected to retract said latch means.

10. The vehicle of claim 6 including manipulable means mounted on said body near the front end thereof and operatively connected to shift said retractable means.

11. A dump body vehicle comprising a frame including a pair of joined, parallel, longitudinally extending beams, each formed to provide a forward section, a second section merging with said forward section and inclined downwardly and rearwardly, and a rear section, an axle for each beam, each axle having an inwardly-extending portion journal mounted on the rear section of its associated beam, a forwardly-extending portion, a downwardly-extending portion and an outwardly-extending portion, a wheel journalled on the outwardly-extending portion of each axle, a platform for each axle, each platform being fixed relative to the forwardly-extending portion of its associated axle and extending forwardly therefrom in overlying relation to its associated beam, upstanding suspension means carried by each platform, a body having its rear region disposed between and pivotally supported by said suspension means, roller means at the forward region of said body and disposed to ride upon upwardly-presented surfaces of the forward sections and the inclined sections of said beams, retractable retainer means at the forward region of said body and disposed, when not retracted, cooperatively to underlie downwardly-presented surfaces of said forward sections and inclined sections of said beams, and retractable latch means carried by each of said beams and engageable with the platform associated with the same beam when said body is in its forwardmost position relative to said frame to retain said platforms against tilting movement relative to said frame.

* * * * *